July 10, 1928.
A. SIMONS
1,677,055
DIAMOND LATHE TOOL
Filed March 20, 1925
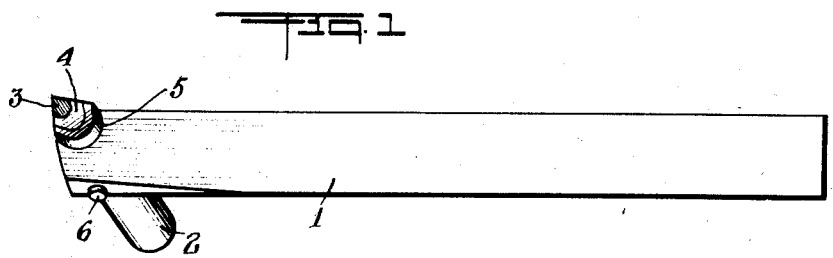
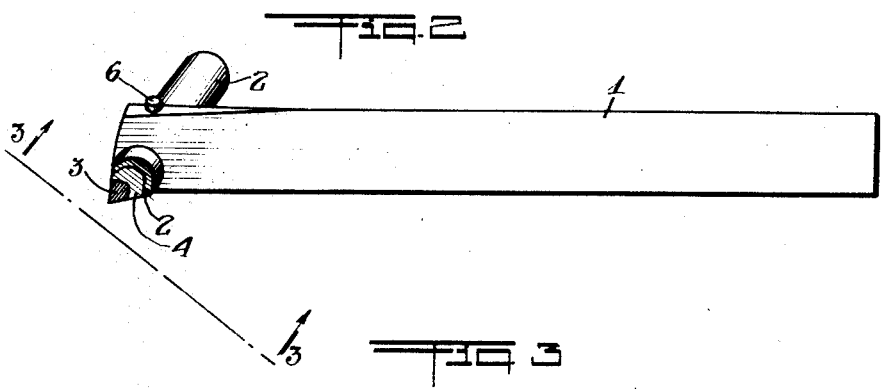
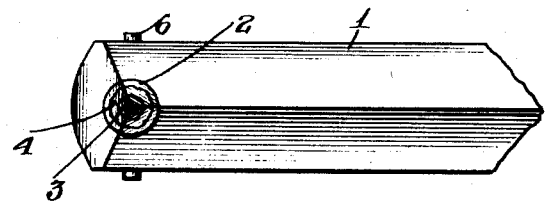
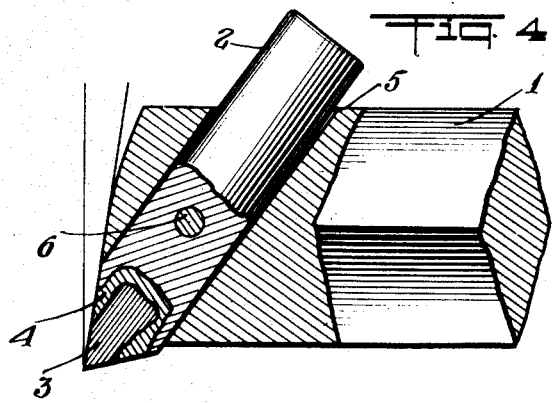
INVENTOR
*Abraham Simons*
BY
*Mocket Blum*
ATTORNEYS Patented July 10, 1928.

1,677,055

UNITED STATES PATENT OFFICE.

ABRAHAM SIMONS, OF NEW YORK, N. Y.

DIAMOND LATHE TOOL.

Application filed March 20, 1925. Serial No. 16,878.

My invention relates to a new and improved diamond lathe tool.

One of the objects of my invention is to provide a turning tool having a diamond point, in which the point will be so mounted that the tool can be used in a lathe for turning surfaces made of material such as phenolic resins, and the like.

Another object of my invention is to produce a lathe tool which can be used as a right hand tool and also as a left-hand tool.

Another object of my invention is to provide a tool provided with a diamond point of pyramidal shape, and having three cutting edges.

Other objects of my invention will be set forth in the following description and drawings, which illustrate a preferred embodiment of my invention. The foregoing general statement of the objects of my invention is for generally explaining it, and not for purposes of limitation.

Fig. 1 is an elevation showing the tool in the position in which it can be used as a left-hand tool.

Fig. 2 shows the tool in the position in which it can be used as a right-hand tool.

Fig. 3 is a view on the line 3—3 shown in Fig. 2, in the direction of the arrows.

Fig. 4 is a detail sectional view, partially in perspective.

The tool holder 1 is made in the well known manner and the tool shank 2 is mounted in an opening or bore 5. The cross-section of the holder 1 is substantially rectangular and the axis of the opening 5 passes through opposite edges of said holder 1 so that each end of said opening 5 extends into at least two adjacent faces of the holder 1. The front of the opening 5 also extends into end face of the holder 1. I prefer to make the cross-section of the holder 1 substantially square. The tool shank or shank 2 is held in position by a pin 6.

The front of the tool holder 2 is provided with a metal nib 4 firmly secured thereto, and an elongated tapering diamond 3 is secured to the nib 4. The broad end of the diamond is at the base of nib 4, to hold the diamond in position. I prefer to firmly imbed the diamond 3 in the nib 4 so as to firmly hold it in place.

I prefer to imbed the diamond 3 in the nib 4 so that the diamond is first completely imbedded in the nib, and then grind the end of the shank 2 so as to expose the point of the diamond and the adjacent part of the tool and give it a pyramidal shape. The three pyramidal faces thus formed have equal angles and are symmetrically disposed with respect to the central longitudinal axis of the shank 2, which is of cylindrical form.

If desired, the tool can be turned.

The front end of the holder 1 is shaped so that the plane thereof is substantially parallel to the adjacent pyramidal face of the diamond, as shown in Fig. 4 and inclined with respect to the longitudinal axis of the holder. The rear of said end is preferably arcuate in form.

The diamond has two lateral cutting edges, whose plane makes an angle of less than ninety degrees (90°) with said longitudinal axis. The angle of the lateral cutting edges with said longitudinal axis is shown in Fig. 4, which also illustrates how the third cutting edge of the diamond is inclined away from said longitudinal axis. This third cutting edge may, for convenience, be designated as the longitudinal cutting edge. This configuration of the diamond enables each cutting edge thereof to have the proper clearance with respect to the article acted upon. The tip of the diamond point is on the longitudinal axis of the shank 2.

It is clear that the diamond point has three substantially similar triangular faces, two of said faces being substantially symmetrically disposed with respect to two adjacent longitudinal faces of the holder, and that the front face of the holder makes an angle of less than ninety degrees with the longitudinal axis of said holder.

I have shown a preferred embodiment of my invention, but it is clear that numerous changes and omissions could be made without deparing from its spirit.

I claim:—

1. In combination, a holder having a plurality of longitudinal and substantially planar faces, a diamond point tool having a shank located within and connected to said holder, said shank being inclined to the longitudinal axis of the holder the front of said shank having an exposed diamond and intersecting two of the adjacent faces of said holder, the tip of said diamond projecting in front of the front of said holder, said diamond having a plurality of cutting edges.

2. In combination, a holder having a plurality of longitudinal substantially planar faces, a diamond point tool having a shank located within and connected to said holder, said shank being inclined to the longitudinal axis of the holder, the front of said shank having an exposed diamond and intersecting two of the adjacent faces of said holder, the said diamond having three like and symmetrically disposed triangular faces so that it has three cutting edges, the tip of said diamond projecting in front of the front of said holder, two of the faces of said diamond being adjacent two of the longitudinal faces of said holder and being symmetrically disposed with respect thereto.

3. In combination, a holder having a substantially square cross-section, said holder having an opening adjacent the front thereof intersecting two opposite longitudinal edges thereof, the said opening being inclined to the longitudinal axis of said holder and intersecting two adjacent faces of said holder at the front thereof, a diamond point tool having a shank located in said bore, the said diamond being partially exposed and being ground to form three substantially similar and symmetrically disposed triangular faces, two of said faces being substantially symmetrically disposed with respect to two adjacent longitudinal faces of said holder, the front face of said holder having an angle of less than ninety degrees (90°) with the longitudinal axis thereof.

In testimony whereof I affix my signature.

ABRAHAM SIMONS.